United States Patent
Bobykin et al.

(10) Patent No.: US 9,274,867 B2
(45) Date of Patent: Mar. 1, 2016

(54) METHOD FOR WEB SITE PUBLISHING USING SHARED HOSTING

(71) Applicants: Anton Bobykin, Novosibirsk (RU);
Mikhail Lavrentiev, Novosibirsk (RU);
Stanislav S. Protassov, Moscow (RU);
Serguei M. Beloussov, Singapore (SG)

(72) Inventors: Anton Bobykin, Novosibirsk (RU);
Mikhail Lavrentiev, Novosibirsk (RU);
Stanislav S. Protassov, Moscow (RU);
Serguei M. Beloussov, Singapore (SG)

(73) Assignee: Parallels IP Holdings GmbH, Schaffhausen (CH)

( * ) Notice: Subject to any disclaimer, the term of this patent is extended or adjusted under 35 U.S.C. 154(b) by 189 days.

(21) Appl. No.: 14/250,201

(22) Filed: Apr. 10, 2014

(65) Prior Publication Data

US 2015/0120812 A1    Apr. 30, 2015

(30) Foreign Application Priority Data

Oct. 28, 2013    (EA) .................................. 2013000145

(51) Int. Cl.
G06F 15/16 (2006.01)
G06F 11/00 (2006.01)
G06F 9/445 (2006.01)

(52) U.S. Cl.
CPC . *G06F 11/00* (2013.01); *G06F 8/60* (2013.01)

(58) Field of Classification Search
CPC ............ G06F 17/30386; G06F 9/5038; G06F 17/30861
USPC ................................... 709/203; 717/115, 148
See application file for complete search history.

(56) References Cited

U.S. PATENT DOCUMENTS

| | | | | |
|---|---|---|---|---|
| 6,260,058 B1 * | 7/2001 | Hoenninger | .......... | G06F 9/4887 718/103 |
| 6,330,572 B1 * | 12/2001 | Sitka | ................. | G06F 17/30082 707/608 |
| 7,392,321 B1 * | 6/2008 | Wolf | .................... | H04L 41/5009 709/203 |
| 8,307,031 B1 * | 11/2012 | Grieve | .................... | H04L 69/40 709/203 |
| 8,352,956 B1 * | 1/2013 | Kishore | .................. | G06F 9/485 718/101 |
| 2003/0110280 A1 * | 6/2003 | Hinchliffe | ............. | H04L 63/145 709/232 |
| 2004/0158722 A1 * | 8/2004 | Carpenter | ........... | G06F 21/6227 713/182 |
| 2005/0022109 A1 * | 1/2005 | Sakai | ................. | G06F 17/30899 715/275 |
| 2005/0030585 A1 | 2/2005 | Suwa et al. | | |
| 2008/0086733 A1 * | 4/2008 | Jensen | .................. | G06F 9/4881 718/102 |
| 2008/0155540 A1 * | 6/2008 | Mock | ..................... | G06Q 10/06 718/100 |
| 2008/0276239 A1 | 11/2008 | Collins | | |
| 2008/0320498 A1 * | 12/2008 | Maykov | ............ | G06F 17/30864 719/320 |
| 2009/0150806 A1 * | 6/2009 | Evje | .................. | G06F 17/30867 715/762 |
| 2009/0292791 A1 | 11/2009 | Livshits | | |

(Continued)

OTHER PUBLICATIONS

Search report in Eurasian App. No. 201301239, dated Mar. 14, 2014.

*Primary Examiner* — Duyen Doan
(74) *Attorney, Agent, or Firm* — Bardmesser Law Group (57) ABSTRACT

A method for publishing the web sites on remote server using shared hosting in cases of unexpected server timeouts. A list of elements (work items) to be published is generated. The list is sorted out according to dependencies of elements from one another. Then, the work items are sorted out by the priority. The work item from the top of the list (with the highest priority) is processed first. After the work is performed with this work item, the work item is marked as closed if the process has executed successfully. Then, the process moves to the next work item and so on. The process has a library of the work items. Thus, in case of a server timeout, the process knows exactly which work items have been processed prior to the timeout and can start the processing from the next work item.

11 Claims, 4 Drawing Sheets

(56) References Cited

U.S. PATENT DOCUMENTS

| | | | | |
|---|---|---|---|---|
| 2011/0208809 A1* | 8/2011 | Ito | ............... | H04N 1/00222 709/203 |
| 2012/0210323 A1* | 8/2012 | Hosouchi | ............... | G06F 9/5038 718/102 |
| 2013/0086274 A1 | 4/2013 | Goswami et al. | | |
| 2014/0208294 A1* | 7/2014 | Randhir | ............... | G06F 9/45512 717/115 |
| 2014/0229221 A1* | 8/2014 | Shih | ............... | G06Q 10/06313 705/7.23 |
| 2015/0205633 A1* | 7/2015 | Kaptur | ............... | G06F 9/4881 718/102 |

\* cited by examiner

METHOD FOR WEB SITE PUBLISHING USING SHARED HOSTING

CROSS-REFERENCE TO RELATED APPLICATIONS

This application claims priority to Eurasian Application No. 2013000145, filed on Oct. 28, 2013, which is incorporated herein by reference in its entirety.

BACKGROUND OF THE INVENTION

1. Field of the Invention

The present invention relates to a method for mass online publishing web sites and/or similar tasks performed in shared hosting environments.

2. Description of the Related Art

In shared hosting infrastructure there are some complex tasks that are performed on the hoster's server side while the user describe the task and sends command to the server using simple client software such as web browser or more specific software such as a site builder or a Presence Builder marketed by Parallels®. Typically, web site publishing is a complex task that takes an unpredictable amount of time. A web site content can be created either by transferring files via the file transfer protocol (ftp) from one server to another or by generating dynamic content on the hoster's server from pre-defined templates, by executing scripts or the like, or by updating a database. The databases can be updated either by connecting a new user to a shared databases or by sorting and updating content of a private databases of the previously published web site.

The databases may contain a data to be used directly or after digital processing and callable scripts. Some other web site-related tasks that can take a long time, for example, backup of a web site and restoration of a web site from a snapshot. This time depends on a web site private area size. If the site contains one redirection string (i.e., a link), it can be done in a short time (e.g., 1 second) after getting a request from a user. The same relates to upgrade of a web site, import of a web site from an old version and generation of web site content reports (statistics).

All of these tasks can take a significant amount of time. In order to protect hosting users from users with long execution tasks, a timeout for tasks execution is implemented on the hosting server. In a shared hosting infrastructure, all services (e.g., http, fastcgi, etc.) may have timeouts. The timeouts are configured by the web server administrators, and the client computer, which issues the request for transferring the files or other tasks, does not usually know about the timeout duration.

Typically, in shared hosting systems, the script execution times are less than a minute for each script. In that way, the scripts of different users are executed simultaneously and randomly and no one user can overload or crash the server. In other words, the limits are set for all PHP scripts on the server. The limits can be the same or can differ for different clients.

Thus, if the process is interrupted by the server timeout, in the conventional art the client needs to initiate it again and the reason for the timeouts is hidden from the client. This way, the client cannot correct script efficiently since he usually gets notification when the complex task has already failed/timed out.

Accordingly, since difficulty and correctness of the tasks' execution cannot be predicted by the users, there is a need in the art for an efficient way for publishing, upgrading and backing up the web sites on remote server using shared hosting in cases of unexpected server timeouts.

SUMMARY OF THE INVENTION

Accordingly, the present invention is directed to a method for execution of task related to web site publishing, upgrades and backups and, more particularly, to publishing the web sites on remote server in shared hosting environment in cases of unexpected script execution times and corresponding those times to hosting server timeouts, that substantially obviates one or more of the disadvantages of the related art.

According to an exemplary embodiment, a list of elements (work items) to be published is generated. The list is sorted out according to dependencies of work items from one another. Then, the work items are sorted out by the priority. The work item from the top of the lists (with the highest priority) is processed first. This work item is marked as "in process." After the work is performed with this work item, the work item is marked as closed if the process has executed successfully. Then, the process moves to the next work item and so on. The work items are specific to each process. Each process selects its own work items. The process has a library of the work items. Thus, in case of a server timeout, the process knows exactly which work items have been processed prior to the timeout and can start the processing from the next work item. Some of the work items get suspended in the "in process" state. These work items are restarted by the scheduler, when its own timeout expires.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF EMBODIMENTS OF THE INVENTION

Reference will now be made in detail to the embodiments of the present invention, examples of which are illustrated in the accompanying drawings.

According to an exemplary embodiment, a list of tasks (work items) for publishing the web site is generated on the server. The tasks can contain new elements to be uploaded from a client to the server, the creating hierarchies and connections, updating connecting catalogs to the site or other tasks. The task itself can contain a short string expression and it cannot be estimated if the task needs more or less time for its complete execution. In the exemplary embodiment, when the items are added to the site, the list is sorted according to dependencies of the work items from one another. Then, the work items are sorted by the priority.

The work item from the top of the lists (with the highest priority) is processed first. This work item is marked as "in process." After the work is performed with this work item, the work item is marked as closed if the process has executed successfully. Then, the process moves to the next work item and so on. The work items are specific to each process. Each process selects its own work items. The process has a library of the work items. Thus, in case of a server timeout, the process knows exactly which work items have been processed prior to the timeout and can start the processing from the next work item with the exception of the "in process" work items.

According to the exemplary embodiment, each task can be divided into several tasks that require less time for execution than the entire task. For example, if the task requires updating of 1000 fields of a database, the sub-tasks can update 100 fields each. The entire task requests for a "full database update." The process of dividing the tasks into the sub-tasks can include requesting a number of fields of the database, grouping fields into short groups and generating scripts for tasks in the shorten groups. It should be noted that if the tasks are executed as the "site publishing tasks," they should be formed in a way that guarantees execution within the pre-defined time limits. The "dividing" of the scripts or the tasks can be generated and tested for the entire provider's server.

In one aspect of the invention, the service provider can use blocking software to limit a number of retries of a single task execution. For example, if the task starts and fails five times, then the task is blocked for 12 hours. Note that if the task is blocked, it may be blocked with all the dependent tasks. The exemplary embodiment can start the tasks dividing process, if the limit is expired. Thus, the user can publish the site successfully. In another embodiment, the dividing can start after each script failure occurs. Thus, the computational resources of the provider are saved, since a number of failed tasks can be reduced.

In another exemplary embodiment, the system employs a procedure for estimating a manner for the dividing of the tasks and a number of chunks (sub-tasks) to be generated after the division. The expiration point is fixed and the rest of the task execution time can be estimated. The division of the estimated time by the time limit can produce a number of chunks or an amount of the performed operation executed prior to the expiration point. This can also produce the estimation for the chunk size. The real number of chunks can be increased or the chunk size can be reduced to guarantee a successful execution of the divided task.

A work item dispatcher controls the work items processing and determines the next work item to be processed by a work item processor according to the work items dependency. The work item dependency is set while dividing the tasks into the sub-tasks or chunks or work items. The work items can be divided into sub-items, if the previous division produces no success. The initial hierarchy can be set up by a user or a site developed. For example, if the dependencies need to be updated after the database sorting, all the sub-tasks of the sorted tasks must be finished before updating of the sub-tasks dependencies is started. However, if sorting and updating the connections can be executed over the portions of the database, the sorting and updating of the sub-tasks can be started by pairs and more or less independently.

If the sorting is not successfully executed the first time, the connection updating can be divided into the sub-tasks, even if it is not yet started. Some tasks are expected by the user right away. Some other system tasks can be executed with a delay (e.g., generation of web site reports, collection of the statistics etc.). If all work items have been processed or are being processed by the work item processor, the dispatcher generates "complete" command.

According to the exemplary embodiment, the dispatcher creates a use case including zero use case (no use case) each time the task, which includes a work item, is added to the list of tasks. The non-zero use cases create simple tasks execution dependencies. The use cases for deleted during division tasks are inactive, but expired data can be cleared from the memory. In another embodiment, the inheritance can be used, where at least some use case for sub-tasks can be used from the source tasks. For example, the use case for the last of sorting sub-task can be a connection update and the use cases for other sorting sub-tasks can be a "continue sorting." Other examples use case=publication, work item 1—transfer files from a folder A to the published site into folder B; work-item 2—launch a script C on the published site. The use case includes the work items that have interdependencies based on their execution order.

Additionally, a use case is generated for a process interrupted by the timeout. If the process has completed with errors or was interrupted, the work items processor executes "commit corrupt" command. If the work item's execution generates and error, all the execution of the dependent work items is terminated. If a script was interrupted by the timeout the user cannot know it immediately. However, if the script takes a long time it indicates that it was stopped by the timeout. In this case, the work item is not considered fatal and is restarted several times. If the process still generates an error, the error is considered fatal. The user is notified and the error is recorded. The system administrator is notified and the user can start the use case again.

For example, a publication task is divided into 100 sub-tasks (work items). In the exemplary system, one execution request executed 20 work items. If the execution of the request was interrupted by the timeout and only 17 work items have been executed and the $18^{th}$ work item fell on the execution timeout. The system encounters the "pending" $18^{th}$ work item and realizes that its processing capacity is less than the 20 work items per execution request. Subsequently, the system automatically reduces a number of the work items per execution request to 17. Then the system attempts to execute the work items from the $18^{th}$ through the $25^{th}$. If the $18^{th}$ work item generates an execution error, then the problem is with the particular work item. The system attempt to execute the $18^{th}$ work item 3 times (total of 5 attempts altogether).

If the execution is not successful, the $18^{th}$ work item (along with all of the dependent work items) is marked as a critical error. In another exemplary scenario, all 20 work items have been executed within one execution request. Then, the system attempts to increase a number of the work items per execution request. In other words, the system automatically adapts to an optimal processing mode based on execution results. According to the exemplary embodiment, a chain of processes of work items is executed. If one of the key processes is interrupted, the results of all of the dependent processes need to be discarded as well. The interdependency of the processes is determined by a developer who writes the work items: in order to execute a work item 1, the work item 2 needs to be ready. In other words, the dependencies are already provided in the product logic.

The work items depend from each other. The work items depend from one another based on their execution order. It is also possible to have some independent work items. The work items' dependencies are written in the code. The scheduler has a queue data structure, where the work items to be processed are collected. When a Use case is added and divided into the work items, the queue has the data reflecting the work items' dependencies (i.e., an execution order).

According to another exemplary embodiment, small subtasks can be aggregated into larger tasks for execution. For example, 100 operations are included into a script as micro-scripts numbered from 1 to 100. The increment between the micro-scripts is 1. The micro-scripts can be grouped by 50 in each group. The group can be aggregated into one executable script, for example 1-50 and 51-100 (with incremental step of 1 or 20). The aggregation of micro-scripts serves to optimize the processing of a task.

According to the exemplary embodiment, the system displays an execution progress bar to a user. The progress bar can indicate a number of the executed script from the user task. The system displays execution of a first sub-script as 50% of the task. Then, after the second (dependent) sub-script is started the progress bar shows the progress from 51% to 100%. However, if the second sub-script script is not executed within the time limit, the progress bar goes back to 50%. Subsequently, the second sub-script is divided into micro-scripts that are sent to execution.

If processing of one work item has not completed successfully, all dependent work items are considered to be not processed successfully and are taken out of the processing queue. The shared hosting environment has strict rules for the scripts executed on the server. A maximum script execution time, a maximum processor time and memory used are limited. However, the Web Presence Builder uses a lot of tasks requiring long execution times. For example:

1. FTP site publishing (because of the remote server response time);
2. HTTP requests to the published sites or other services (e.g., ecwid, picassa, disquss);
3. Collection of user statistics;
4. Reloading site from backups (including loading snapshots scripts); and
5. Creation of site based on a selected site topic including site design generation.

The processing script can be forced to stop execution based on the timeout. Additionally, a user needs to be informed about the execution progress via a progress bar. Other limits are set by the PHP script, which starts after receiving a request and stops immediately after execution of the request. Not all shared hosting systems support the cron. The cron does not exist in APS 1.2 and in MS Windows™. An example of a tasks executed by cron are statistics collections and report generation.

Accordingly, the exemplary embodiment uses a special scheduler module, which is controlled by AJAX requests from a client application. The Web Presence Builder divides each of the long tasks into short work items that are executed in an asynchronous mode. Note that the work items have interdependency. The work items execution time can be from 0.1 to 1.5 seconds. In case of web site publishing, the work items are:

1. Checking availability of hosting: checking the FTP connection, HTTP connection, and hosting compatibility check;
2. Preparation and publishing of common resources for the site (css/js/images needed for all pages—depends on work item 1);
3. Compilation and publishing of the first page and required resources (depends on work item 1);
4. Compilation and publishing of the second page and required resources (depends on work item 1);
5. Compilation and publishing of all other pages.

Each work item has a priority. Each work item is registered with the scheduler module with the status "ready for processing." The scheduler module stores the work items into the storage WPB-MySQL/sqlite. The work items have certain types. From the above example, the types are: checking availability of hosting; preparation and publishing of common resources for the site; compilation and publishing of the webpage. Other examples of work items' types are:

1. Collection of statistics of use of a particular module type on the web site;
2. User registration in ECWID system;
3. Collection of number of visits for a week.

According to the exemplary embodiment, the scheduler module operates as follows. The request "execute task" is received. The scheduler module returns time in seconds, after which the client needs to repeat the request. Note that the type of the request is the same, but the request is different. A time stamp of the beginning of the processing is recorded by the scheduler.

The execution of multiple work items is checked by the scheduler at the same time. The work items that exceeded the timeout are considered failed. These work items' status is changed back to "ready for processing" and allowed execution time is reduced by 1 second. According to the exemplary embodiment, each work item in the queue has its approximated execution time in milliseconds assigned (calculated based on volumes of the transferred files and an average transfer time). The execution time is approximated because it depends on a processor load, I/O, network and a remote system.

It is also expected that an execution of a long task will be interrupted after an unknown timeout. The scheduler attempts to guess the execution timeout and create the work items in such a way that they can be executed before the timeout. Thus, the scheduler reduces the execution time by one second so the request is executed the next time within the timeout. The scheduler tries to have a maximum number of the work items to be executed during one request processing session. Otherwise, the aggregate user waiting time increases.

However, the reduced execution time should not be less than a maximum average execution time of any types of tasks. An aggregate number of executed tasks are calculated. If this number exceeds a threshold set in the scheduler configurations, the scheduler stops working and returns a current computation time of requests. The threshold is a maximum time of execution of the task (request) that is "guessed" by the scheduler.

The work items processor takes the work item with the highest priority from the work items with the status "ready for processing." Note that the work items processor takes the oldest work item which has all dependencies satisfied. The work items processor has to be able to process this work item in the remaining request time based on the average execution time of the work items of a given type.

If such a work item is not found, the processing is completed and a current computation time of requests is returned. The status "in processing" is assigned to the work item, the work item is processed and the actual execution time is recorded. The work item is removed from the processing queue. The processor calculates a new average execution time for the work item of the given type based on collected statistics. For example, the task is to transfer files locally from a folder to a published side. An average time of transferring one megabyte of data to the published side is calculated. This data is used for determining the processing time for subsequent work items and for each type of work items. If the processing of the work item has taken longer than a maximum allowed time, the maximum allowed time is increased by, for example, one second. The maximum allowed time can be increased by a pre-set arbitrary time. The request processing time can take from 3 seconds to 10 minutes.

Subsequently, a new time for processing the requests is calculated as follows: T=f (allowed execution time, current number of executed work items, average time required for execution of entire queue). A time between the requests is one second, if there are work items in the queue. If the queue is empty, the time is ten seconds.

An execution request can ask "what time is left for the task" (the task is not divided into the work items). This request can return an error or a time left for execution of the task. The user needs to see the progress of execution of his process. For example, the publication progress bar is shown based on the above request.

An average system performance is calculated (i.e., a number of seconds of the queue processed in one second). Then, a current execution time required for the last work item of the task is divided by the system performance. The execution time (i.e., speed) is used in order to see if the work item fits into the request processing session. The processing speed can be used to determine the frequency of requests for processing the work item queue.

Figure 1:
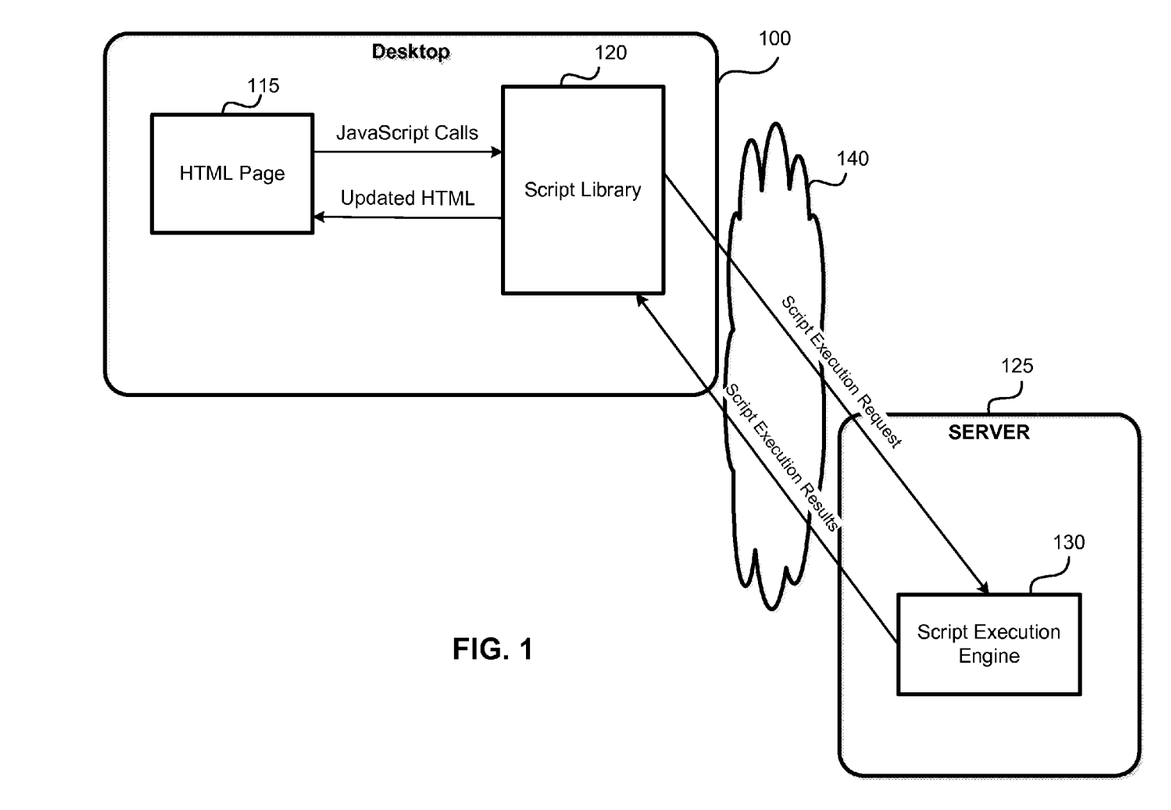
FIG. 1 illustrates a general architecture of a system, in accordance with the exemplary embodiment.

FIG. 1 illustrates a general architecture of a system, in accordance with the exemplary embodiment. A client desktop 100 is connected to a server 125 over the Internet 140. The client desktop 100 has HTML pages 115 updated by a script library 120. The HTML page 115 defines the Java Script Call to the script library 120 and receives the updates. The script library 120 is connected to a script execution engine 130 residing on the server 125. The script library 120 sends a script execution request, and the script execution engine 130 executes the scripts and returns the execution results to the script library 120. Thus, the HTML page 115 is updated by execution of separate work items.

Alternatively, the script execution engine 130 residing on the server 125 serves as a script parsing engine. In this scenario, the entire script from the script library is sent to the script execution engine 130, which parses the script into sub-scripts and executes the sub-scripts based on their dependency order.

Figure 2:
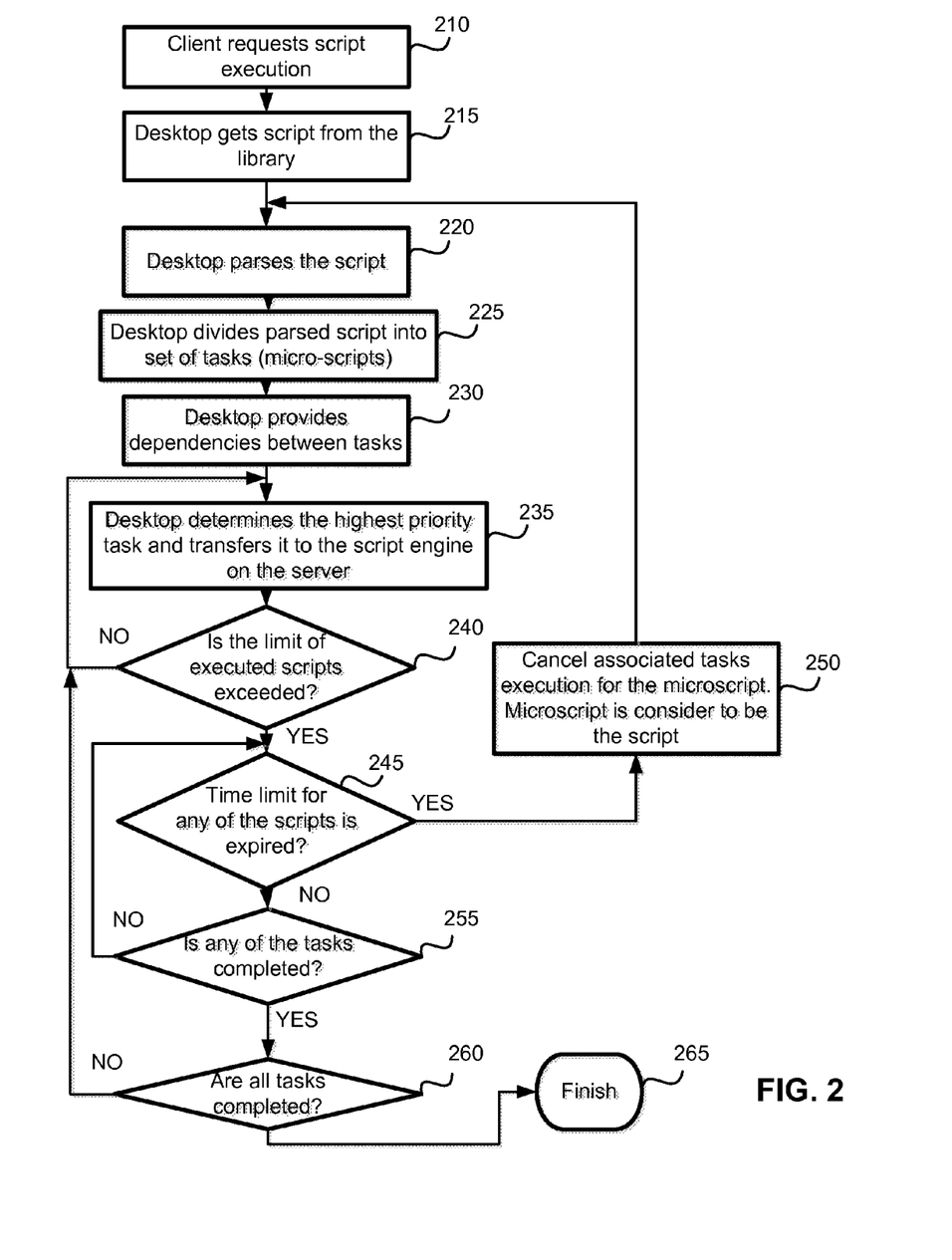
FIG. 2 illustrates a flow chart of a method for web publishing, in accordance with the exemplary embodiment.

FIG. 2 illustrates a flow chart of a method in accordance with the exemplary embodiment. A client requests a script execution in step 210. A desktop acquires the script from a script library in step 215. The desktop parses the script in step 220. The desktop divides the parsed script into a set of tasks (micro-scripts) in step 225. Note that the micro-scripts are the work items—i.e., portions of a large script. Note that the task script can be divided on the server side by the script parsing engine. The advantage of the invention is achieved when some of the scripts are generated with errors and cannot be completed during execution. Parsing the scripts can generate an exception when the script has an internal error, or error may be corrected properly on the server side. An exception message is transferred to the user as soon as the exception generation occurs and forces him to correct the script. The desktop provides dependencies between the tasks in step 230. Then, in step 235, the desktop determines the highest priority task and transfers it to the script engine on the server. Alternatively, the script engine divides the script and sets the dependencies of the sub-scripts.

If, in step 240, the limit of the executed script is not exceeded, the process goes back step 235 and sends another script to the script engine. Otherwise, in step 245, the process determines if a time limit for any of the scripts is expired. If the time limit has expired in step 245, the process cancels the execution of the associated tasks and the micro-script is considered to be a script in step 250. Then, the micro-script is parsed in step 220.

If, in step 245, the time limit for any of the script is not expired, the process checks if any of the tasks are completed in step 255. If the tasks are completed, the process checks if all of the tasks are completed in step 260. Then, the process is finished in step 265. If, in step 255, the tasks are not completed, the process moves back to step 245 and checks if the time limit for any of the scripts has expired. According to the exemplary embodiment, if one work item cannot processed within the timeout limit, the work item can be divided into smaller work items according to code indicating how the Use case is divided.

Figure 3:
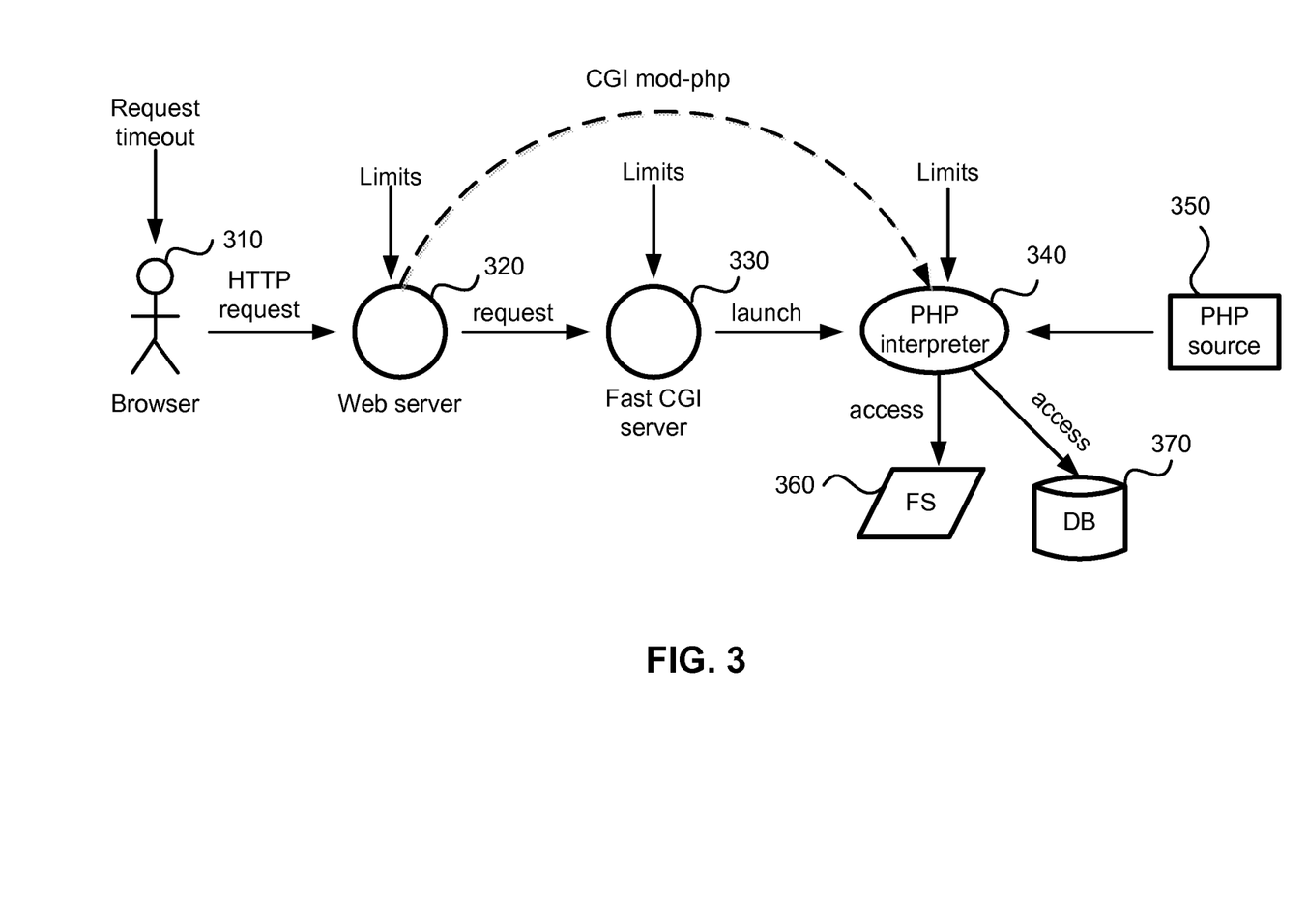
FIG. 3 illustrates a workflow of using the work items (micro-scripts), in accordance with the exemplary embodiment.

FIG. 3 illustrates a workflow of using the work items (micro-scripts), in accordance with the exemplary embodiment. A user browser 310 sends an HTTP request to a web server 310. Then, the request is sent or a direct call is made to a FastCGI server 330, which launches PHP scripts more efficiently than a conventional CGI server. As shown in FIG. 3, the FastCGI server 330 launches the scripts in more isolated environment than mod_php. A PHP interpreter 340 acquires data from a PHP source 350 and executes scripts using a server file system 360 and a database 370. The PHP source 350 has web application codes used for processing the HTTP requests (i.e., for example in Presence Builder, WordPress, Joomla, etc.) Note that the web server 320, the FastCGI server 330 and the PHP interpreter 340 have pre-configured limits for maximum execution time and for maximum uploaded file size (max_execution_time and max_upload_file_size).

Figure 4:
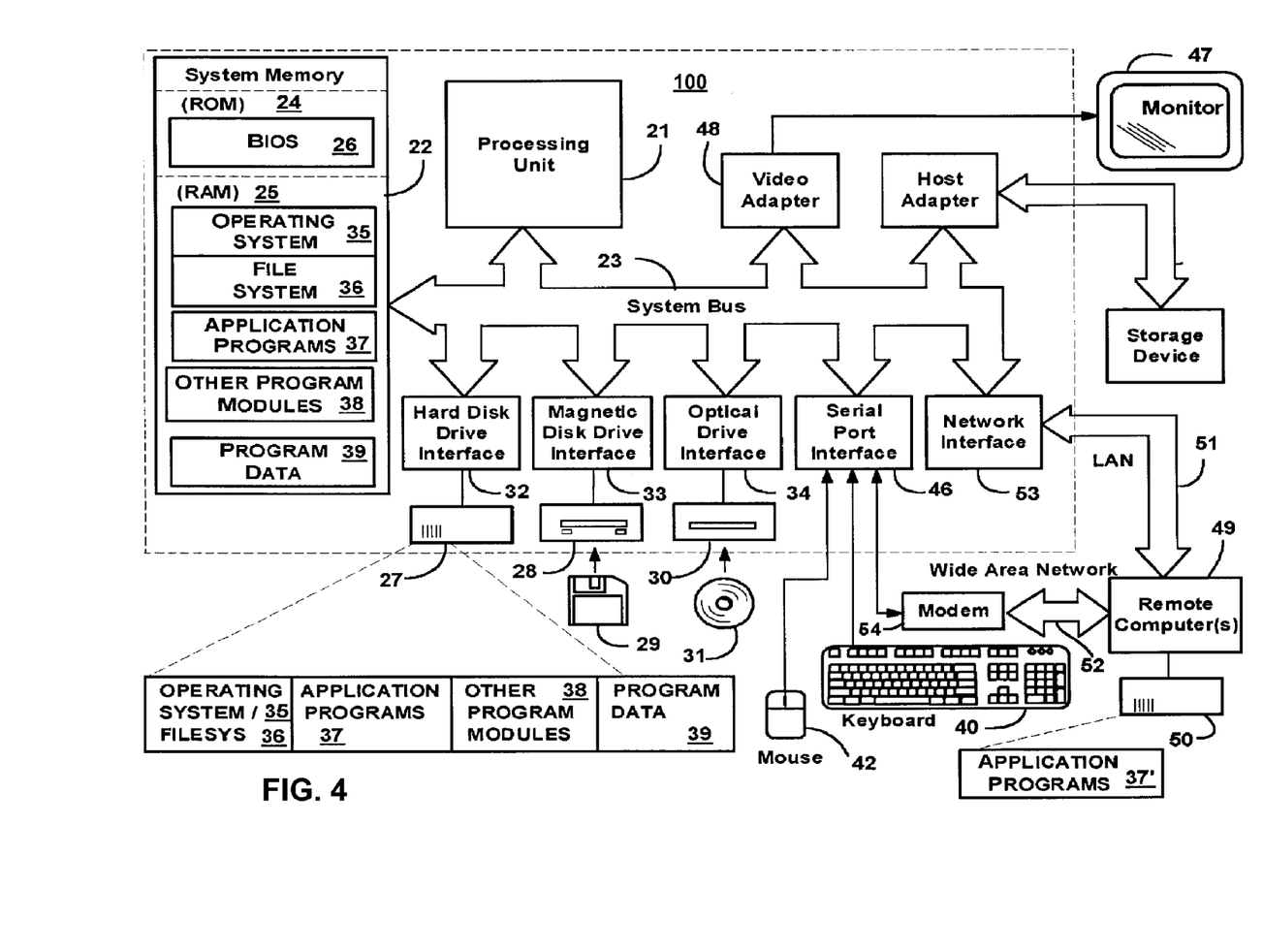
FIG. 4 illustrates a diagram of an exemplary computer or a server that can be used in the invention.

With reference to FIG. 4, an exemplary system for implementing the invention includes a general purpose computing device in the form of a personal computer (or a node) 100 or server or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the computer 100, such as during start-up, is stored in ROM 24. The personal computer/node 100 may further include a hard disk drive for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 100.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™ 2000). The computer 100 includes a file system 36 associated with or included within the operating system 35, such as the WINDOWS NT™ File System (NTFS), one or more application programs 37, other program modules 38 and program data 39. A user may enter commands and information into the personal computer 100 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device, such as a hard disk drive, a magnetic tape, or other type of storage device is also connected to the system bus 23 via an interface, such as a host adapter via a connection interface, such as Integrated Drive Electronics (IDE), Advanced Technology Attachment (ATA), Ultra ATA, Small Computer System Interface (SCSI), SATA, Serial SCSI and the like.

The computer 100 may operate in a networked environment using logical connections to one or more remote computers 49. The remote computer (or computers) 49 may be another personal computer, a server, a router, a network PC, a peer device or other common network node, and typically includes many or all of the elements described above relative to the computer 100.

The computer 100 may further include a memory storage device 50. The logical connections include a local area network (LAN) 51 and a wide area network (WAN) 52. Such networking environments are commonplace in offices, enterprise-wide computer networks, Intranets and the Internet. When used in a LAN networking environment, the personal computer 100 is connected to the local area network 51 through a network interface or adapter 53.

When used in a WAN networking environment, the personal computer 100 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 100, or portions thereof, may be stored in the remote memory storage device. It will be appreciated that the network connections shown are exemplary and other means of establishing a communications link between the computers may be used.

Having thus described the different embodiments of a system and method, it should be apparent to those skilled in the art that certain advantages of the described method and apparatus have been achieved. In particular, it should be appreciated by those skilled in the art that the proposed method provides for efficient web site publishing using shared hosting.

It should also be appreciated that various modifications, adaptations, and alternative embodiments thereof may be made within the scope and spirit of the present invention. The invention is further defined by the following claims.

What is claimed is:

1. A system for executing tasks in a shared hosting infrastructure, the system comprising:
 a processor and a memory coupled to the processor;
 computer code loaded into the memory and executing on the processor to perform the following:
 a client receiving data from a server through Internet protocol;
 a plurality of scripts residing on the client, the plurality of scripts used in task formation and configured for sending scripts to a script execution engine residing on the server;
 a script parsing engine configured to parse the scripts and divide the scripts into sub-scripts;
 wherein:
 the script execution engine limits execution time for each script and sub-script;
 the script parsing engine is configured to order the scripts based on a dependency of the scripts from each other; and
 the script parsing engine is configured to divide the sub-script into micro-scripts, if the execution time of the sub-script exceeds a time limit.

2. The system of claim 1, wherein the dividing scripts into sub-scripts is performed after a predefined number of unsuccessful attempts of script executions.

3. The system of claim 1, wherein the script parsing engine runs on the server.

4. The system of claim 1, wherein the script parsing engine is configured to send a sub-scripts' execution status to the client.

5. The system of claim 4, further comprising showing a script execution progress bar to a user.

6. The system of claim 1, wherein the task is any of:
 publishing the client's web-site;
 a backup of a web site;
 a restoration of a web site from a snapshot;
 an upgrade of a web site;
 an import of a web site; and
 generation of a web site content.

7. The system of claim 1, wherein the client receives a number of unsuccessful attempts of script executions set by the server.

8. The system of claim 1, wherein execution of the sub-scripts starts before a complete execution of the sub-scripts with a higher priority.

9. The system of claim 1, wherein the scripts are stored in a script library residing on the client.

10. A system for executing tasks in a shared hosting infrastructure, the system comprising:
 a processor and a memory coupled to the processor;
 computer code loaded into the memory and executing on the processor to perform the following:
 a client receiving data from a server;
 at least one script residing on the client and used in task formation,
 the client configured for sending scripts to an execution engine residing on the server;

a parsing engine configured to parse the scripts and divide the scripts into sub-scripts;

wherein:

the execution engine limits execution time for each script and sub-script;

the parsing engine orders the scripts based on a dependency of the scripts from each other; and the parsing engine divides the sub-script into smaller units, if the execution time of the sub-script exceeds a time limit.

11. A method for executing tasks in a shared hosting infrastructure, the method comprising:

on a computer having a processor and a memory, executing computer code on the processor to perform the following:

receiving data on a client from a server;

configuring the client for sending scripts to an execution engine residing on the server; and configuring a parsing engine to parse the scripts and divide the scripts into sub-scripts;

wherein:

the execution engine limits execution time for each script and sub-script;

the parsing engine orders the scripts based on a dependency of the scripts from each other; and the parsing engine divides the sub-script into smaller units, if the execution time of the sub-script exceeds a time limit.

\* \* \* \* \*